(12) United States Patent
Bolos et al.

(10) Patent No.: US 11,197,547 B2
(45) Date of Patent: Dec. 14, 2021

(54) SUCTION-ATTACHED SHELVING SYSTEMS AND METHODS

(71) Applicant: Abvious, LLC, Burr Ridge, IL (US)

(72) Inventors: Michael F. Bolos, Chicago, IL (US); Jason Grohowski, Chicago, IL (US); Kyle Buzzard, Lombard, IL (US); Gary Paulsen, Chicago, IL (US)

(73) Assignee: Abvious, LLC, Burr Ridge, IL (US)

(*) Notice: Subject to any disclaimer, the term of this patent is extended or adjusted under 35 U.S.C. 154(b) by 0 days.

(21) Appl. No.: 16/887,434

(22) Filed: May 29, 2020

(65) Prior Publication Data

US 2020/0375360 A1 Dec. 3, 2020

Related U.S. Application Data

(60) Provisional application No. 62/854,767, filed on May 30, 2019.

(51) Int. Cl.
| | |
|---|---|
| *A47B 96/02* | (2006.01) |
| *F16B 47/00* | (2006.01) |
| *A47B 46/00* | (2006.01) |
| *A47B 57/04* | (2006.01) |

(52) U.S. Cl.
CPC .......... *A47B 96/028* (2013.01); *A47B 46/005* (2013.01); *A47B 57/045* (2013.01); *A47B 96/025* (2013.01); *F16B 47/00* (2013.01)

(58) Field of Classification Search
CPC ... A47B 96/028; A47B 46/005; A47B 57/045; A47B 96/025; A47B 96/07; F16B 47/00; F16B 47/006
See application file for complete search history.

(56) References Cited

U.S. PATENT DOCUMENTS

| | | | | |
|---|---|---|---|---|
| 4,836,482 A | * | 6/1989 | Sokol | B60R 11/02 248/206.3 |
| 5,025,919 A | * | 6/1991 | Brinker | B42D 5/006 206/214 |
| 5,096,272 A | | 3/1992 | Belokin et al. | |
| 5,156,450 A | * | 10/1992 | Lee | A47K 5/02 248/205.5 |
| 5,683,157 A | * | 11/1997 | Peterson | A47J 33/00 312/100 |
| 5,695,164 A | * | 12/1997 | Hartmann | B60R 11/00 248/206.4 |
| 6,036,071 A | * | 3/2000 | Hartmann | B60R 11/00 224/482 |
| D458,072 S | | 6/2002 | Hoernig | |
| 6,402,104 B1 | * | 6/2002 | Smith | A47K 1/09 248/205.5 |

(Continued)

*Primary Examiner* — Ko H Chan

(74) *Attorney, Agent, or Firm* — Barich IP Law Group

(57) ABSTRACT

A suction-attached shelving system and method is provided. The system includes a suction-based attachment structure including a releasable suction disc, a suction housing, and a suction lever arm. The suction-based attachment structure may be attached to a vertical surface such as a window by using the suction lever arm to establish a suctional engagement of the releasable suction disc and suction housing with the vertical surface. The suction-based attachment structure is connected to a shelf structure by a shelf rotation axle. The shelf structure includes a front portion that may be folded relative to a back portion for ease of transport.

18 Claims, 15 Drawing Sheets

(56) References Cited

U.S. PATENT DOCUMENTS

| | | | |
|---|---|---|---|
| D493,316 S | | 7/2004 | Hoernig |
| D508,646 S | | 8/2005 | Gates |
| D509,088 S | | 9/2005 | Hoernig |
| D520,288 S | | 5/2006 | Grosfillex |
| 7,229,059 B1 | * | 6/2007 | Hood ..................... B60R 11/00 |
| | | | 248/518 |
| D552,970 S | * | 10/2007 | Brassard ........................ D8/354 |
| D570,146 S | | 6/2008 | Bickler |
| D577,239 S | | 9/2008 | Krumpe |
| 7,527,231 B2 | * | 5/2009 | Zhadanov ............... F16B 47/00 |
| | | | 248/206.2 |
| 7,578,487 B2 | | 8/2009 | Kaneda et al. |
| 7,850,133 B2 | * | 12/2010 | Carnevali ............... F16B 47/00 |
| | | | 248/205.5 |
| 8,104,142 B2 | * | 1/2012 | Lowry .................. E05D 11/082 |
| | | | 16/307 |
| 8,393,113 B2 | | 3/2013 | Rex |
| 2009/0045155 A1 | | 2/2009 | Howard |
| 2015/0108134 A1 | | 4/2015 | Fangyuan |
| 2017/0202281 A1 | | 7/2017 | Passaretti et al. |
| 2019/0023357 A1 | * | 1/2019 | Barwick ................ B63B 29/04 |

* cited by examiner

SUCTION-ATTACHED SHELVING SYSTEMS AND METHODS

CROSS-REFERENCE TO RELATED APPLICATIONS

The present application claims the benefit of U.S. Provisional Application No. 62/854,767, filed May 30, 2019, entitled "SUCTION-ATTACHED SHELVING SYSTEMS AND METHODS", which is hereby incorporated by reference in its entirety.

BACKGROUND OF THE INVENTION

The present invention generally relates to a folding shelf system. More particularly, the present invention relates to a folding shelf system that may be engaged to a vertical surface by suction.

Although suction-based window attachment systems are present in the prior art, such systems are typically rudimentary in structure. For example, U.S. Pat. No. 5,096,272 to Belokin shows an adjustable width display shelf. The display stand may be detachably mounted on the inside surface of a transparent door panel using a plurality of suction cups. However, the display stand is primarily used for product display and merely attached by pressing the suction cups into the surface.

Similarly, U.S. Pat. No. 8,393,113 to Rex shows a suction cup surface mounted shelf and planter assembly. The suction cup surface mounted shelf and planter assembly may be used as a window box planter or to hold items of minimal weight. However, again, the suction attachment system is rudimentary and includes suction cups that are attached merely by being pressed onto the surface.

BRIEF SUMMARY OF THE INVENTION

One or more of the embodiments of the present invention provide a suction-attached shelving system and method. In a first embodiment, a suction-based attachment structure is provided that includes a releasable suction disc, a suction housing, and a suction lever arm. The suction-based attachment structure may be attached to a vertical surface such as a window by using the suction lever arm to establish a suctional engagement of the releasable suction disc and suction housing with the vertical surface. The suction-based attachment structure is connected to a shelf structure by a shelf rotation axle. The shelf rotation axle may include a plurality of keys that lock the rotation of the shelf structure and suction-based attachment structure in pre-defined, desired rotational positions. Further, the shelf structure includes a front portion that may be folded relative to a back portion for ease of transport.

In additional embodiments, alternative shelf structure positioning systems, such as a rail-based system, a slit-based system, and a turntable based system are shown.

DETAILED DESCRIPTION OF THE INVENTION

Figure 1:
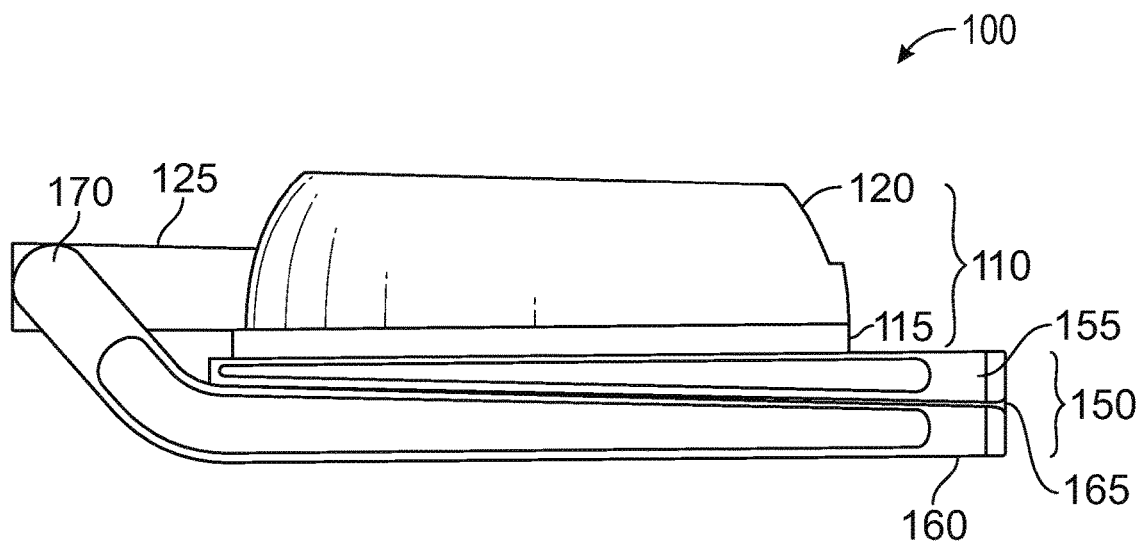
FIG. 1 illustrates a suction-attached shelving system in a folded configuration according to an embodiment of the present invention.

FIG. 1 illustrates a suction-attached shelving system 100 in a folded configuration according to an embodiment of the present invention. The suction-attached shelving system 100 includes a suction-based attachment structure 110 including a releasable suction disc 115, a suction disc housing 120, and a plurality of suction disc support arms 125. The suction-attached shelving system 100 also includes a shelf structure 150 including a front shelf portion 155, a back shelf portion 160, a plurality of shelf hinges 165. As further described herein the suction-based attachment structure 110 may rotate relative to the shelf structure 150 along a shelf rotation axle 170.

Figure 2:
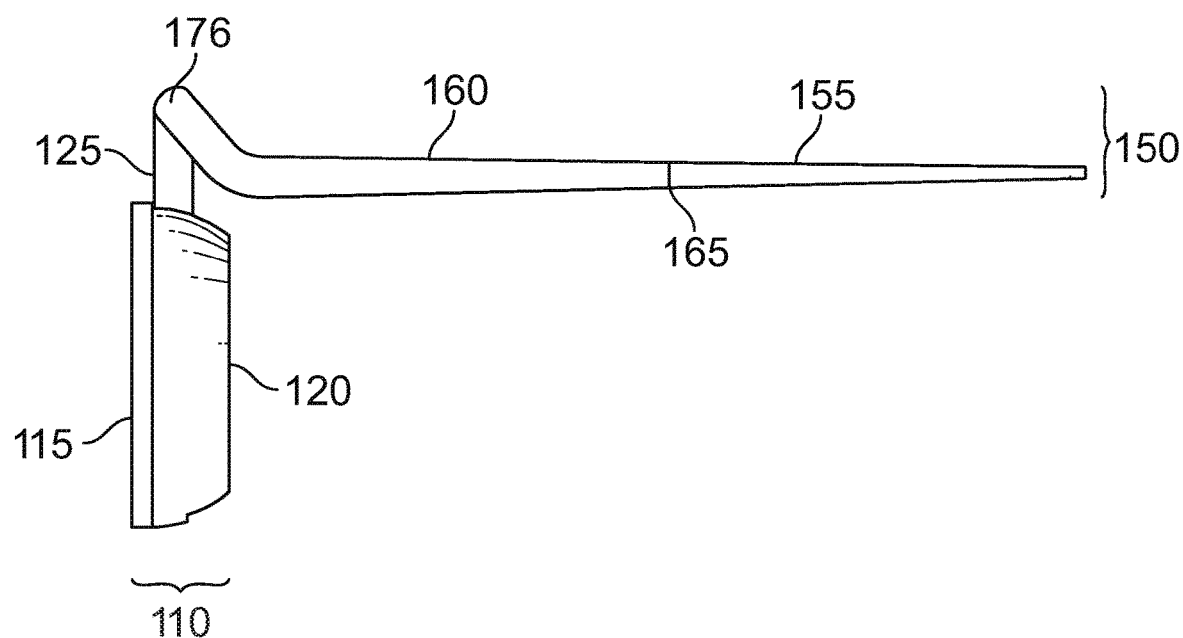
FIG. 2 illustrates the suction-attached shelving system of FIG. 1 in an unfolded configuration according to an embodiment of the present invention.

FIG. 2 illustrates the suction-attached shelving system 100 of FIG. 1 in an unfolded configuration according to an embodiment of the present invention. In FIG. 2, the unfolded position of the suction-based attachment structure 110, releasable suction disc 115, suction disc housing 120, plurality of suction disc support arms 125, shelf structure 150, front shelf portion 155, back shelf portion 160, a plurality of shelf hinges 165 and shelf rotation axle 170 are shown.

Figure 3:
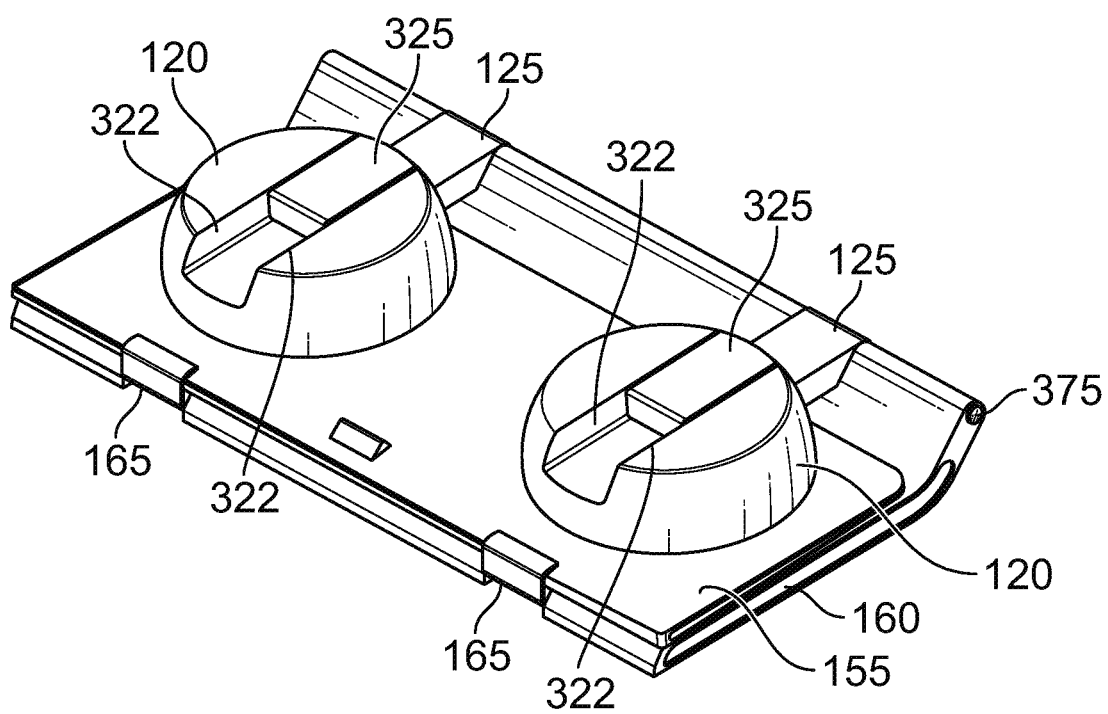
FIG. 3 illustrates a perspective view of the suction-attached shelving system of FIG. 1 in the folded configuration according to an embodiment of the present invention.

FIG. 3 illustrates a perspective view of the suction-attached shelving system 100 of FIG. 1 in the folded configuration according to an embodiment of the present invention. FIG. 3 shows the structures mentioned above in FIG. 1 of the suction disc housings 120, suction disc support arms 125, front shelf portion 155, back shelf portion, and shelf hinges 165. Additionally, FIG. 3 shows a plurality of suction lever arms 325 and a release pin 375.

As shown in FIGS. 1-3, the present suction-attached shelving system 100 may be folded into a folded configuration, for example for transport or storage, and may be unfolded into a unfolded configuration for use.

In operation, the suction-attached shelving system 100 may be unfolded into the unfolded configuration and then suction-engaged with a flat surface, such as a window using the suction-based attachment structure 110 as further described below. The suction connection formed by the suction-based attachment structure is sufficient to support the suction-attached shelving system 100 and additional weight that may be placed on the shelf structure 150.

In one embodiment, the suction-attached shelving system 100 includes a pair of releasable suction discs 115 that may be attached and removed from a vertical structure such as a window.

Figure 4:
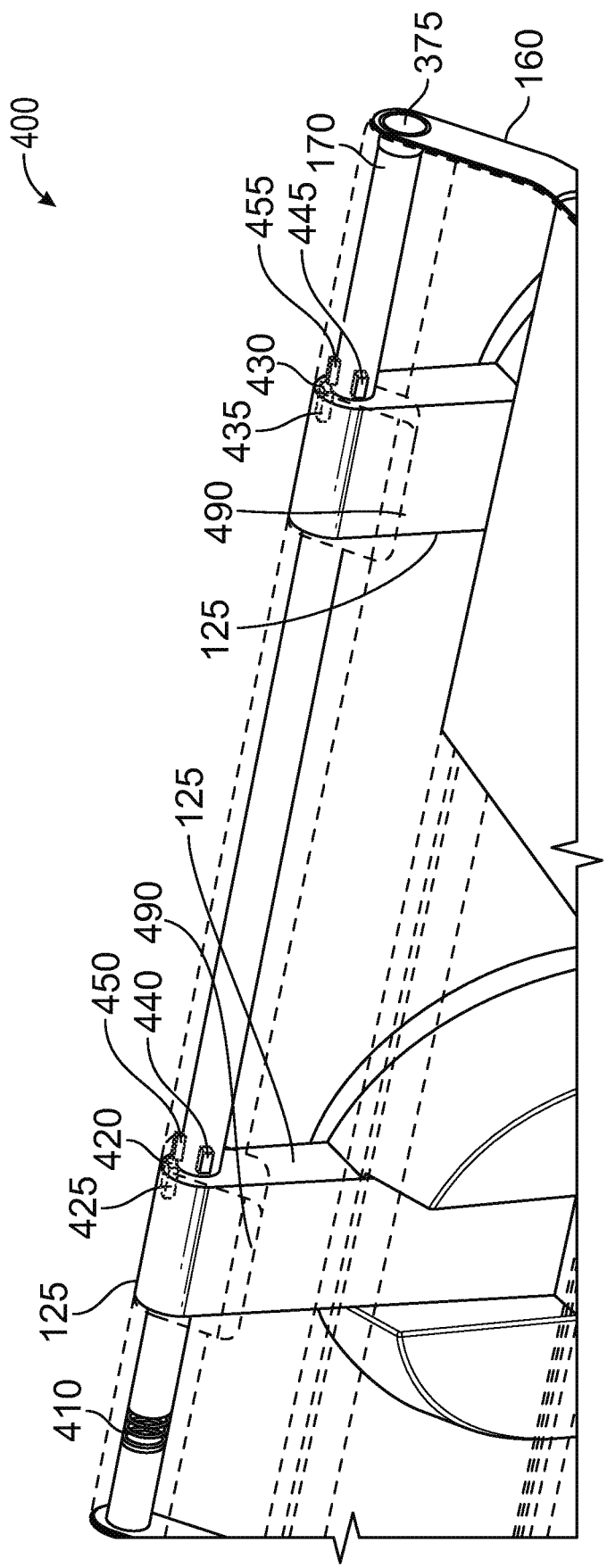
FIG. 4 illustrates a transparent view of the suction-attached shelving system of FIG. 1 in an unfolded configuration according to an embodiment of the present invention.

FIG. 4 illustrates a transparent view 400 of the suction-attached shelving system 100 of FIG. 1 in an unfolded configuration according to an embodiment of the present invention. FIG. 4 shows the suction disc support arms 125, back shelf portion 160, shelf rotation axle 170. As shown in FIG. 4, the shelf rotation axle 170 terminates on one end with the release pin 375. The release pin is biased axially outward by the release pin spring 410. The shelf rotation axle 170 includes a plurality of shelf engagement keys 420, 430. The shelf engagement keys 420, 430 may be axially displaced into shelf rotation apertures 425, 435 by pressing the release pin 375 from a shelf engagement position to a shelf rotation position.

More specifically, when the release pin 375 is pressed, the shelf rotation axle 170 and the attached shelf engagement keys 420, 430 are axially displaced into the shelf rotation apertures 425, 435 positioned on the sides of the suction disc arms 325. This allows the suction-based attachment structure 110 and back shelf portion 160 to rotate freely relative to each other.

Conversely, when the release pin 375 is released, the shelf rotation axle 170 and the attached shelf engagement keys are axially displaced outward by the release pin spring. The spring force provided by the release pin spring 410 induces the shelf engagement keys 420,430 to enter one of two apertures positioned in the back shelf portion 160 including a plurality of folded position key apertures 440, 445 and a plurality of unfolded position key apertures 450, 455.

When the shelf engagement keys 420,430 are induced into the folded position key apertures 440, 445, they operate to fix the rotational position of the suction-based attachment structure 110 and back shelf portion 160 in the folded position. This may prevent the suction-based attachment structure 110 and shelf structure 150 from unfolding while in transportation.

Conversely, when the shelf engagement keys 420,430 are induced into the unfolded position key apertures 450, 455, they operate to fix the rotational position of the suction-based attachment structure 110 and back shelf portion 160 in the unfolded position. Thus, when the suction discs 115 of the suction-based attachment structure 110 are suctionally-engaged with a vertical support surface, such as a window, for example, the engagement of the shelf engagement keys 420,430 with the unfolded position key apertures 450, 455 maintains the back shelf portion 160 at a substantially horizontal and level position so that it may be used as a shelf. Additionally, this may minimize upward bounce that may occur as a result of the user accidentally striking the front or back shelf portion in an upward movement or as a result of recoil from downward pressure placed on the back or front shelf portion.

In one embodiment, the suction disc support arms 125 rotate as one unit for ease of use rather than rotating individually. However, in another embodiment, the suction disc support arms 125 may rotate individually.

Additionally, FIG. 4 illustrates the mechanical stops 490. The mechanical stops 490 are a flat vertical structure located on the back shelf portion 160 that contacts the suction disc support arms 125 and serves as a mechanical stop to the rotation of the suction disc support arms 125 relative to the back shelf portion 160. This ensures that the main shelf and the suction-based attachment structure 110 remain perpendicular to one another when in the unfolded position.

Figure 5:
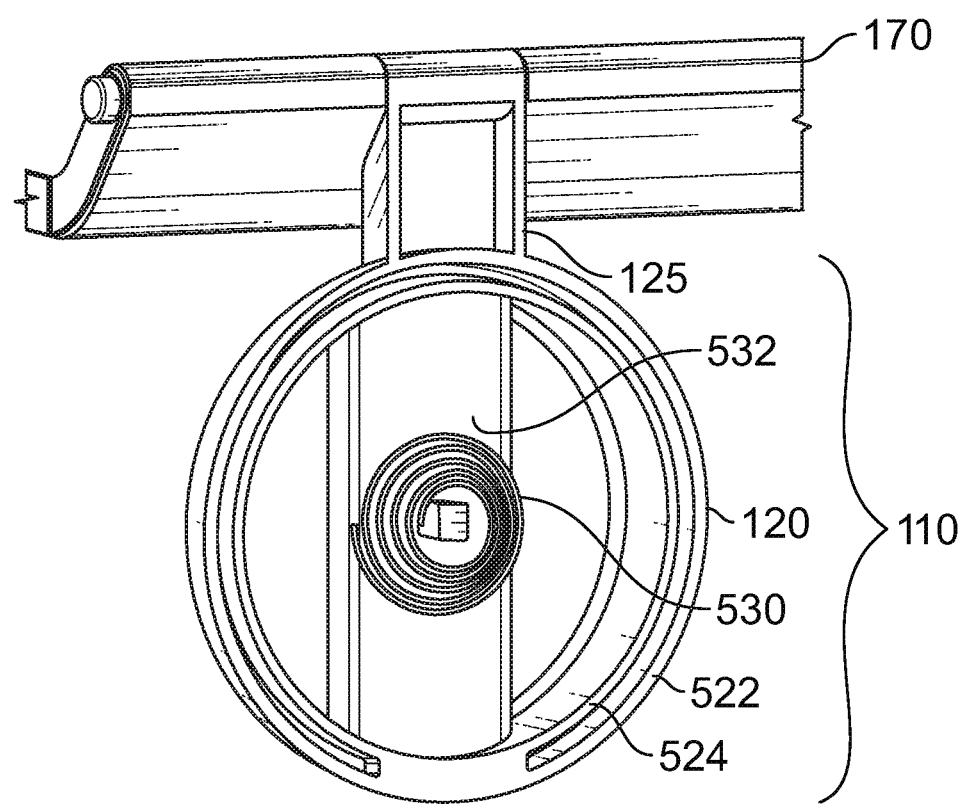
FIG. 5 illustrates a suction-based attachment structure with the suction disc removed.

FIG. 5 illustrates a suction-based attachment structure 110 with the suction disc removed. FIG. 5 shows the suction disc housing 120 including a first housing wall 522 and a second housing wall 524. The suction disc housing 120 is connected to a suction disc support arm 125 that rotates around the shelf rotation axle 170. Additionally, a suction disc spring 530 is positioned in the interior of the suction disc housing 120 in a suction disc spring support 532 and placed around a suction disc shaft 610 as further described below in FIG. 6.

Figure 6:
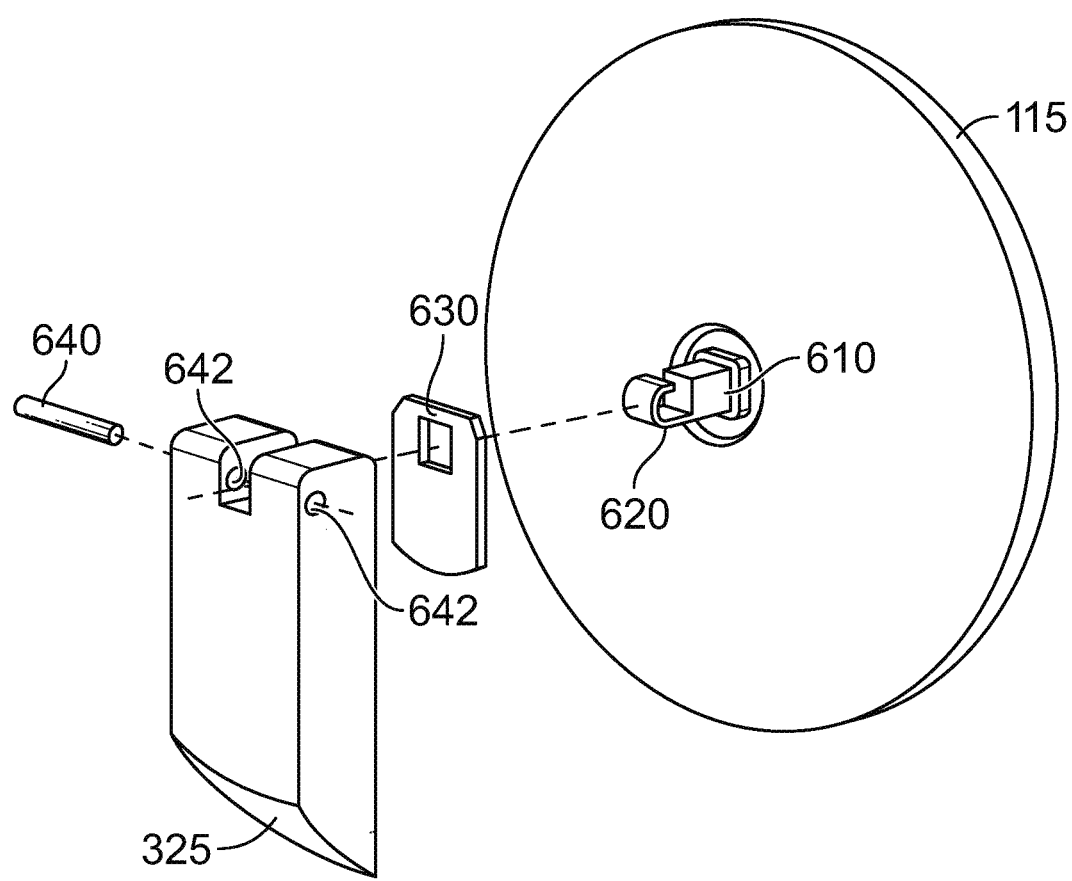
FIG. 6 illustrates an exploded view of the suction disc engagement mechanism.

FIG. 6 illustrates an exploded view of the suction disc engagement mechanism. FIG. 6 shows a suction disc 115 and a suction level arm 375. Additionally, the suction disc 115 is connected to a suction disc shaft 610 that includes a suction disc shaft hook 620. A suction disc strike plate 630 is positioned over the suction disc shaft 610 and suction disc shaft hook 620. A lever pivot bar 640 passes through a pair of level pivot bar apertures 642 in the level arm 325. Once the lever pivot bar 640 is installed in the lever arm 325, the suction disc shaft hook 620 engages the lever pivot bar 640.

Figure 7:
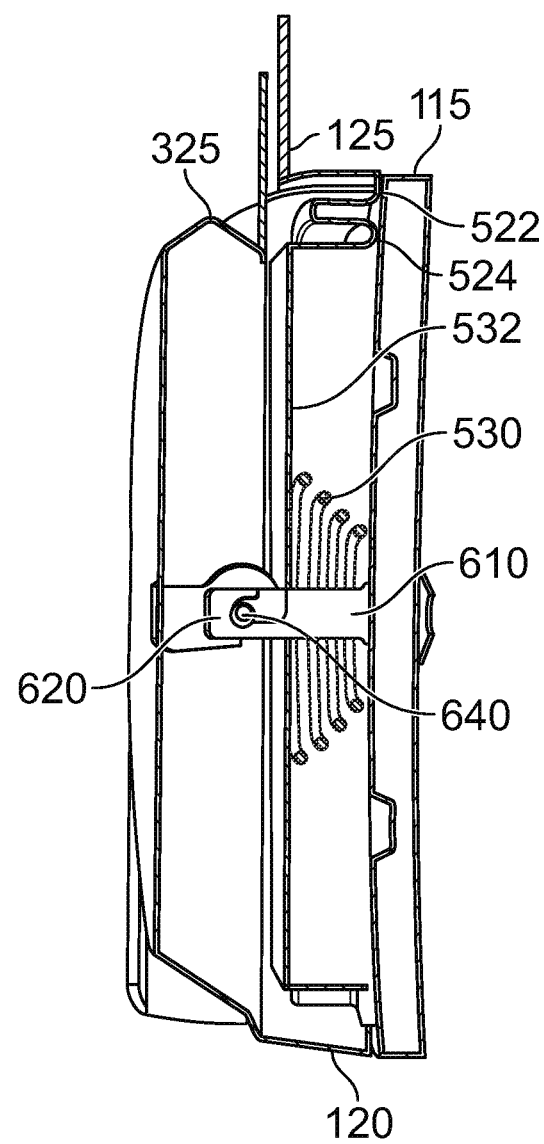
FIG. 7 illustrates a cut-away view of the suction-based attachment structure.

FIG. 7 illustrates a cut-away view of the suction-based attachment structure 110. FIG. 7 shows that suction disc 115, suction disc housing 120, suction disc support arm 125, suction lever arm 325, suction disc spring 520, suction disc spring support 532, first housing wall 522, second housing wall 524, suction disc shaft 610, suction disc shaft hook 620, and lever pivot bar 640.

In operation, the lever arm 325 is rotationally displaced from a released position shown in FIG. 7 to an engaged position with the lever arm 325 pivoted downwardly from the lever pivot bar 640. As the lever arm 325 is pivoted, the rear of the lever arm 325 contacts the surface of the suction disc housing 120 and causes the lever pivot bar 640 to be displaced outwardly from the suction disc housing 120. The displacement of the lever pivot bar 640 is translated to the suction disc shaft hook 620 that is engaged with the lever pivot bar 640. This in turn displaces the suction disc shaft 610 and its attached suction disc 115 toward the lever arm 325, which induces a vacuum between the suction disc 115 and a vertical surface such as a window (not shown).

Conversely, when the lever arm 325 is pivoted from the engaged position to the released position, the suction disc spring 530 causes the displacement of the suction disc shaft 610 and its attached suction disc 115 away from the lever arm 325, which releases the vacuum between the suction disc 115 and the vertical surface such as a window (not shown).

In one embodiment, the suction disc housings 120 fold away to the folded position so that the extent of the shelf system preferably does not protrude beyond or is coextensive with the suction disc housing. Because the suction disc housings fold away, the vertical extent of the shelf system is reduced and consequently the portability of the shelf system is increased and it is less likely to snag on objects during transportation, as well as providing a slim profile for portability. When folded away, the suction discs preferably face the platform to protect the suction discs from damage during transportation.

In one embodiment, the suction disc housings are double-walled. The inner wall engages the suction disc when the lever is in its engaged position. The outer wall protects the edges of the suction discs from being damaged during use and transportation.

When folded away, the suction disc levers preferably lay flat so that the distill extent of the lever does not extend beyond the radius of the suction disc housing. Additionally, the levers are in the release position, so that the suction discs are not stored in the engaged position, which may subject the suction discs to undue strain, compromising the structural integrity of the suction discs over time or result in deformation of the suction discs from remaining in the engaged position for an extended period of time during storage.

Additionally, the suction disc housings protect the levers on both sides so the levers do not catch on objects while being transported. In one embodiment, the edge of the levers come to a triangular point or other angled point in the center as shown, so the levers do not catch and get pulled up by objects while being transported. This also allows for easy use of the levers with the hand in both the release and engaged positions.

Additionally, because the suction disc shaft has a hook shaped design that engages with the rod in the lever running perpendicular to the suction disc shaft, this allows for tool-free removal and replacement of the suction discs.

In one embodiment, both suction disc housings are mechanically connected by the shelf rotation axle 170 so that when the first disc housing rotates, the second disc housing rotates. This allows the user to move the suction discs in tandem when grasping only a single suction disc housing. Thus, the suction disc housings may move together as a single unit for ease of use.

Figure 8:
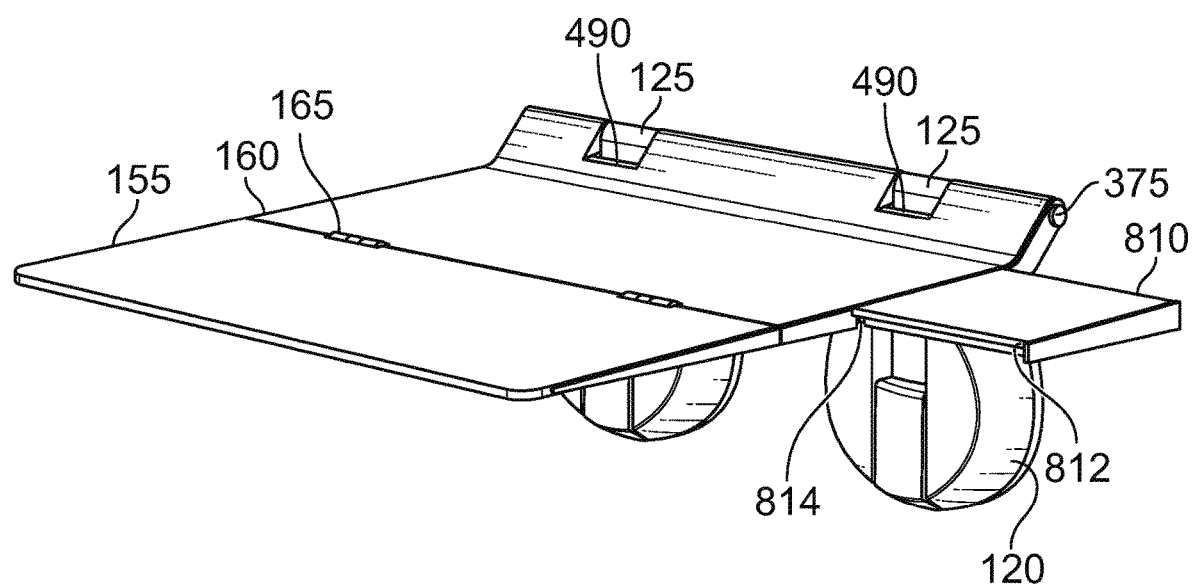
FIG. 8 illustrates and embodiment of the suction-attached shelving system of FIG. 1 with a slide tray in an extended position.

FIG. 8 illustrates an embodiment of the suction-attached shelving system 100 of FIG. 1 with a slide tray 810 in an extended position. FIG. 8 shows the front shelf portion 155, back shelf portion 160, plurality of shelf hinges 165, suction disc housing 120, and release pin 375. In operation, the back shelf portion 160 includes an aperture that is shaped to receive the slide tray 810 so that the slide tray 810 may be slid into and out of the side of the back shelf portion 160. The slide tray 810 may include a plurality of slide tray rails 812 that may be supported by a plurality of slide tray ledges 814 so that the slide tray 810 may be supported.

Also shown in FIG. 8 are the mechanical stops 490 which contact the suction disc support arms 125 when in the unfolded position.

Figure 9:
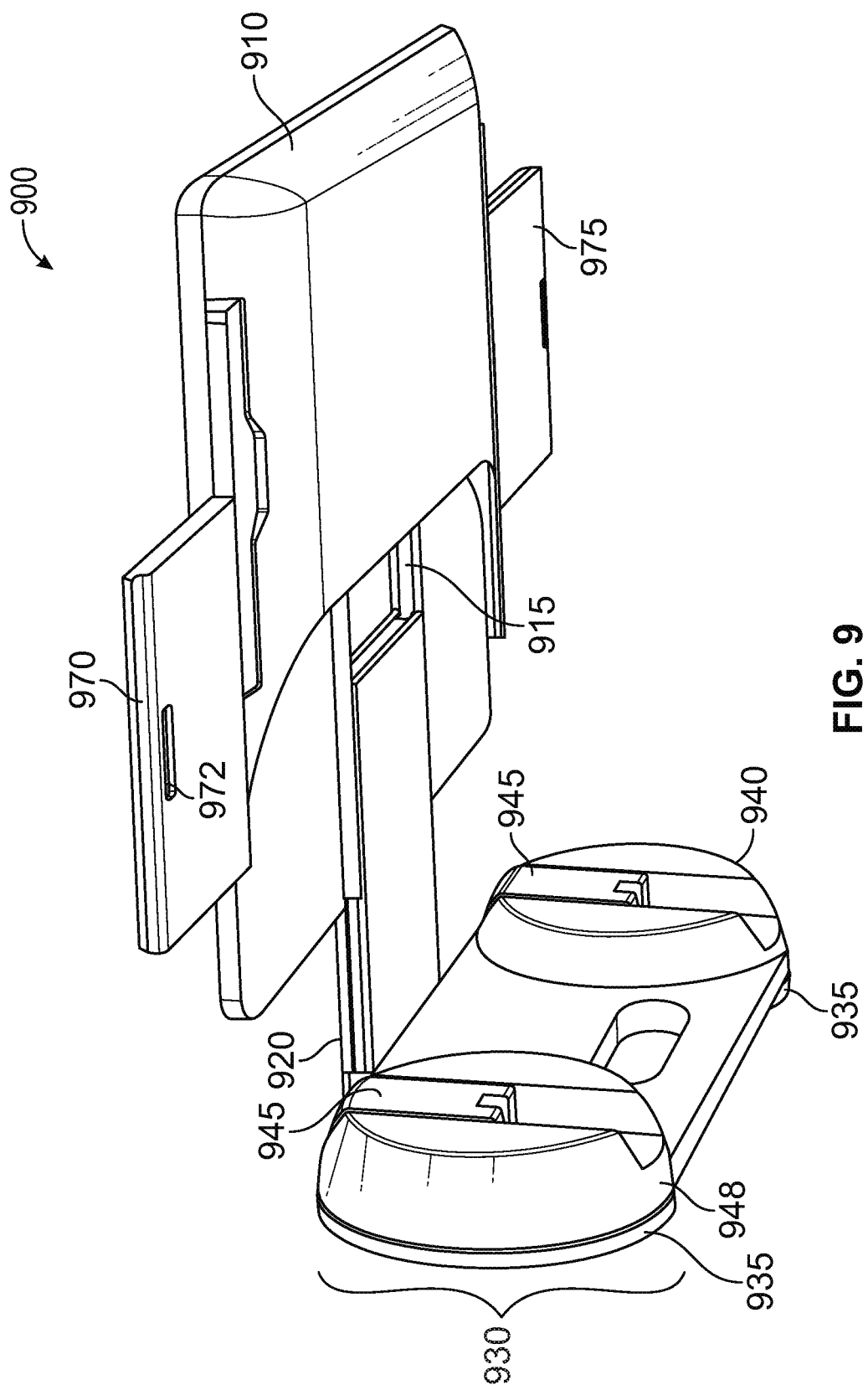
FIG. 9 illustrates a slide-shelf embodiment of the suction-attached shelving system.

FIG. 9 illustrates a slide-shelf embodiment 900 of the suction-attached shelving system. FIG. 9 illustrates a main shelf 910 having a shelf top support 915 that engages with a telescoping shelf base support 920. The shelf base support 920 is in turn rotationally engaged with a suction-based attachment structure 930 including a plurality of releasable suction discs 935, a plurality of suction disc housings 940, and a plurality of suction lever arms 945. Also shown are first slidable side shelf 970 and a second slidable side shelf 975 including slide shelf pull-outs 972.

Figure 10:
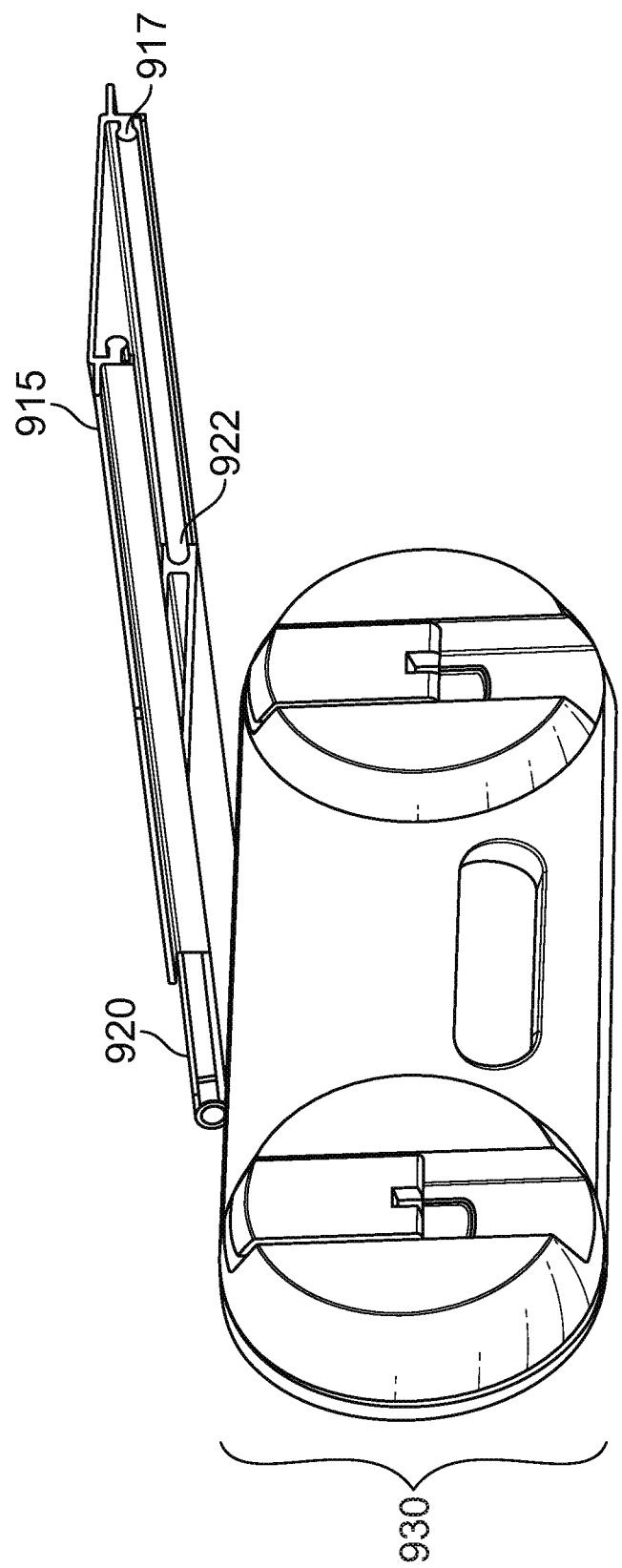
FIG. 10 illustrates a view of the slide-shelf embodiment with the main shelf removed.

FIG. 10 illustrates a view of the slide-shelf embodiment 900 with the main shelf 910 removed. FIG. 10 shows the shelf top support 915 and shelf base support 920. As shown in FIG. 10, the shelf top support 915 includes a plurality of shelf engagement rails 917 that engage with a plurality of shelf engagement rail housings 922 to allow the shelf top support 915 and shelf base support 920 to be slid relative to each other while still supporting the main shelf 910.

In operation, the suction-based attachment structure 930 of FIGS. 9 and 10 operate similarly to the suction-based attachment structure 110 of FIG. 1.

Additionally, the slide-shelf embodiment may be positioned in a folded configuration wherein the suction-based attachment structure 930 is rotated to be substantially parallel with the main shelf 910. Additionally, the shelf top support 915 and shelf base support 920 are positioned so that the rear of the main shelf 910 is proximal to the suction-based attachment structure 930. Alternatively, the slide-shelf embodiment may be positioned in an unfolded configuration as shown in FIG. 9 wherein the suction-based attachment structure 930 is rotated to be substantially perpendicular with the main shelf 910. The suction-based attachment structure 930 would then be suctionally-engaged with a flat surface such as a window by using the suction engagement levers 945 as discussed above. Additionally, the shelf top support 915 and shelf base support 920 may be positioned so that the rear of the main shelf 910 is displaced away from the suction-based attachment structure 930.

Also shown are the side shelf pull-outs 972 which allow a user to pull out side shelves with their finger. The side shelves are initially positioned inside the main shelf, but a user pulling on the shelf pull-out may cause the side shelves to slide out of their housing in the main shelf.

In one embodiment, the side shelves or trays are secured to the main shelf using a plug inserted through the bottom of the main shelf. When the side shelf is pulled out from the main shelf, the plug engages with a lip in the underside of the side shelf, which prevents the side shelf from being separated from the main shelf.

In one embodiment, the suction discs are connected to a unibody housing as shown that serves as: a support to hold the main shelf parallel to the ground, a connection so the suction discs move together versus independently, and a handle for carrying the unit.

The unibody housing slides on a rail that is mounted to the main shelf The rail assembly includes three structures: a main pivot hinge affixed to a shelf base support, which is then attached to the suction disc housings, and a shelf top support, which is attached to the main shelf. The shelf top support contains the rails and the shelf base support contains the rail housings. The rail design allows for easy, stable movement of the housing despite manufacturing tolerances.

The rail also allows the main shelf to be pushed closest to the vertical structure for maximum support or pulled several inches away from the vertical structure to allow additional space for a laptop screen to be tilted back.

When the suction disc housing is folded, two base support securing keys at the back of the suction disc housing lock into two base support securing hooks at the back of the shelf top support to prevent the housing from unfolding during transportation The side shelves are each designed with two rails and a support ledge. The side shelf mounting bracket includes two side shelf securing hooks, a side shelf rail, a side shelf rail housing, and a support ledge. The side shelf includes a side shelf rail and a side shelf rail housing. The two rails engage with their corresponding housings and the side shelf rests on top of the support ledge. This assembly allows the side shelf to be pulled out from the front of the main shelf and then slid along the two rails to the back of the main shelf. The support ledge keeps the side shelf parallel to the ground at all times. The side shelf securing hooks engage with main shelf securing hooks to further secure the side shelf and prevent the side shelf from being separated from the main shelf.

In one embodiment, two recesses are cut into the bottom portion of the main shelf to accommodate the suction discs and protect them from damage during transportation.

In one embodiment, the rails are received inside the rail housings and allow the shelf top support bracket to be slid relative to the shelf base support bracket. The rails also serve to maintain the position of the brackets relative to each other (and thus the horizontal position of the shelf) because the axial length of the rail engages with the interior of the rail housing to maintain the rail in a generally level position.

Figure 11:
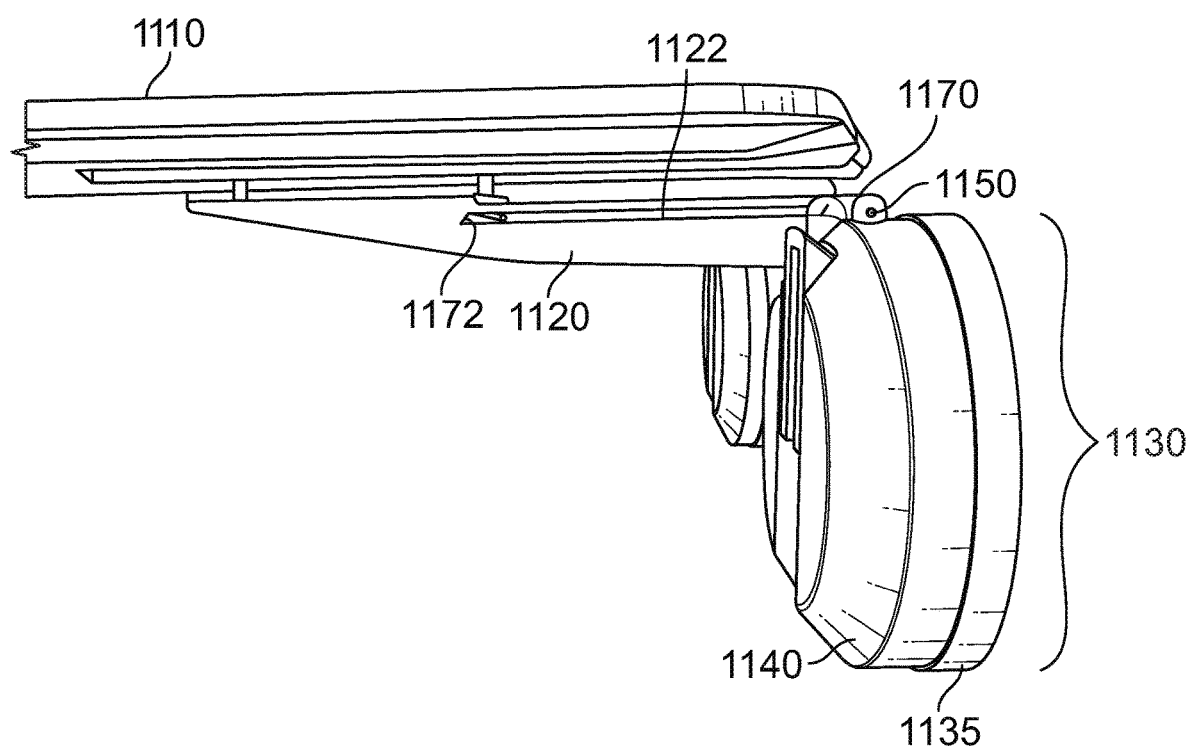
FIG. 11 illustrates a slit-guide embodiment of the suction-attached shelving system.

FIG. 11 illustrates a slit-guide embodiment 1100 of the suction-attached shelving system. FIG. 11 illustrates a main shelf 1110, a mounting bracket 1120, a suction-based attachment structure 1130 including a plurality of releasable suction discs 1135, a plurality of suction disc housings 1140, and a plurality of suction lever arms 1145. Additionally, a sliding pin 1150 is positioned at the top of the suction-based attachment structure 1130. The sliding pin 1150 engages with a mounting bracket slit 1122.

In operation, the slit-guide embodiment 1100 is shown in FIG. 11 in an unfolded position with the sliding pin 1150 slid to a distal end 1170 of the mounting bracket slit 1122 away from the main shelf 1110.

Alternatively, the slit-guide embodiment may be placed in a folded position by positioning the sliding pin 1150 to a proximal end 1172 of the mounting bracket slit 1122 in order to position the suction-based attachment structure 1130 nearer the main shelf 1110. The suction-based attachment structure 1130 may then be pivoted so that the suction discs 1134 are proximal to the bottom of the main shelf 1110.

Outside of the sliding pin 1150, the suction-based attachment structure 1130 operates generally similarly to the suction-based attachment structure 110 of FIG. 1.

Figure 12:
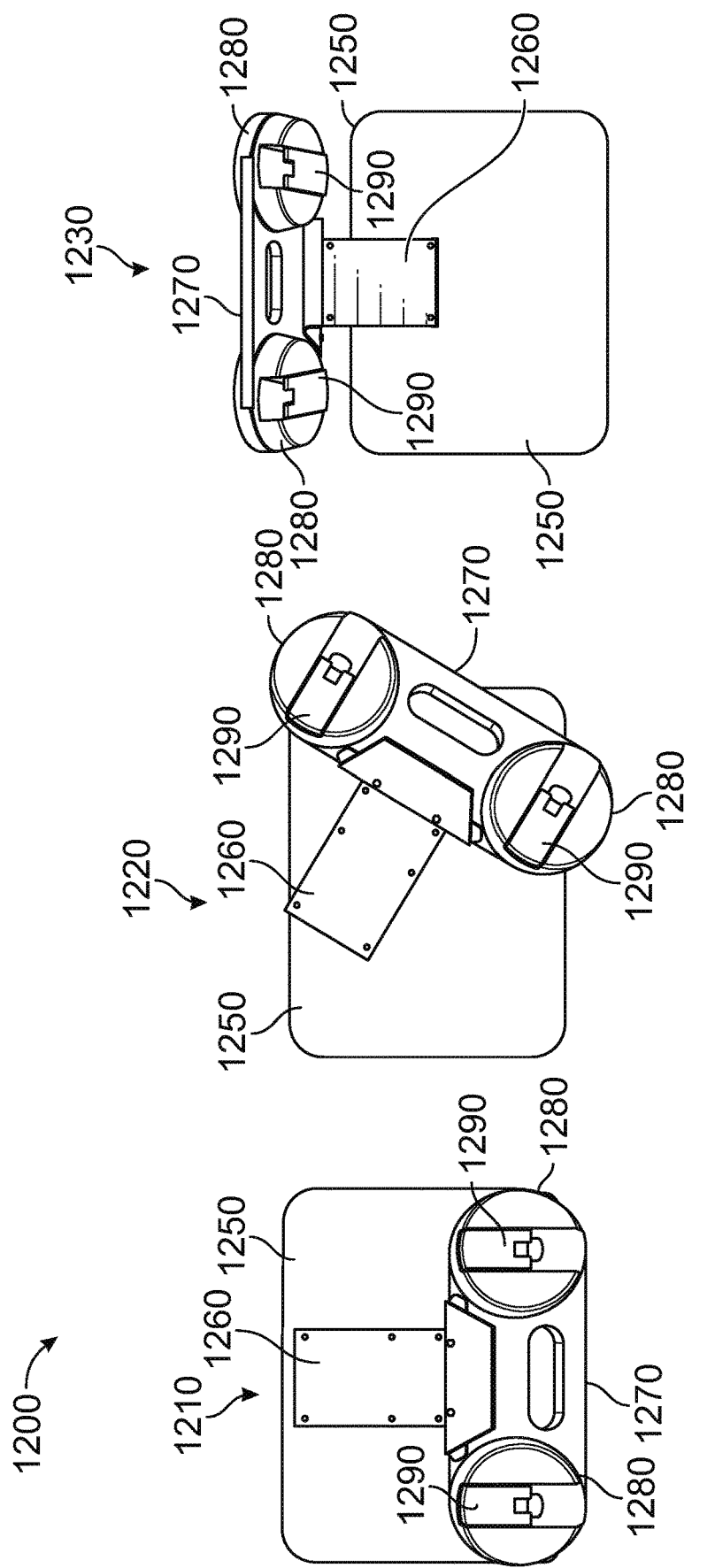
FIG. 12 illustrates a turn-table embodiment of the suction-attached shelving system.

FIG. 12 illustrates a turn-table embodiment 1200 of the suction-attached shelving system. More specifically, FIG. 12 illustrates the transition of the turn-table embodiment 1200 from a folded position 1210 to a rotated position 1220 to an unfolded position 1230. Each position 1210-1230 shows a main shelf 1250, a mounting bracket 1260, and a suction-based attachment structure 1270 including a plurality of suction disc housings 1290 and a plurality of suction lever arms 1290.

Figure 13:
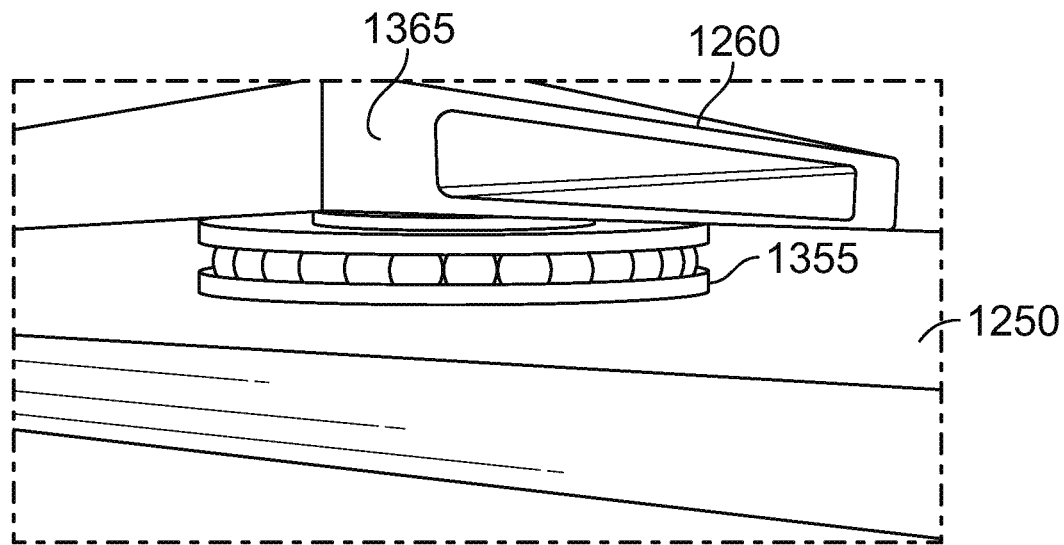
FIG. 13 illustrates a ball-bearing turn table of the turn-table embodiment.

FIG. 13 illustrates a ball-bearing turn table 1355 of the turn-table embodiment 1200. The ball-bearing turn table 1355 is positioned between the mounting bracket 1260 and the main shelf 1250 and allows the mounting bracket 1260 and the main shelf 1250 to be rotated relative to one another.

Figure 14:
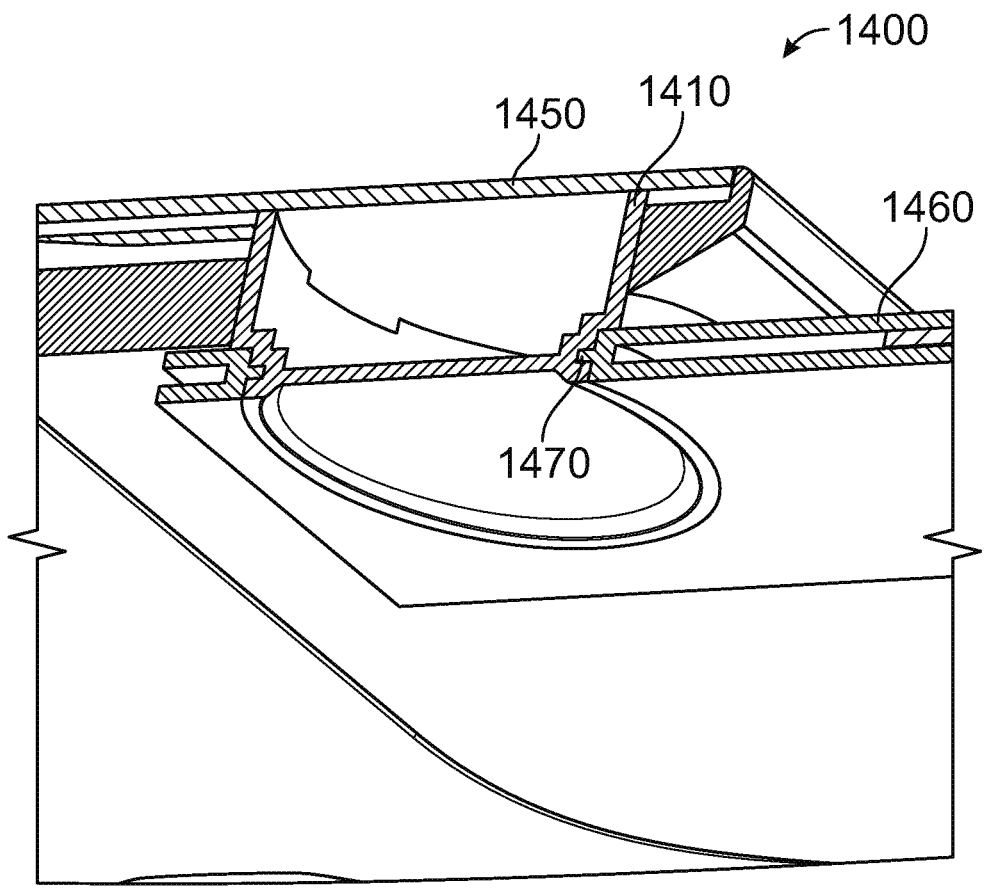
FIG. 14 illustrates an alternative embodiment with a fitted turntable.

FIG. 14 illustrates an alternative embodiment with a fitted turntable 1400. In FIG. 14, instead of the ball-bearing turn table of FIG. 13, a cylindrical rotational element 1410 is embedded in the main shelf 1450 and engages with a circular aperture 1470 in the mounting bracket 1460. Similar to the embodiment of FIG. 13, this allows the main shelf 1450 to be rotated relative to the mounting bracket 1460.

In an alternative embodiment, the cylindrical rotational element may be positioned in the mounting bracket and may engage with a circular aperture in the main shelf.

Figure 15:
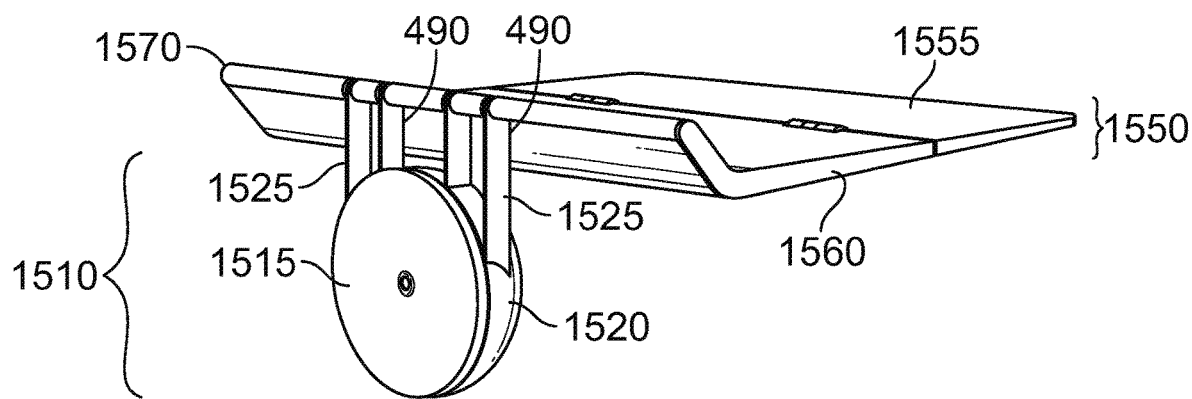
FIG. 15 illustrates an alternative suction-attached shelving system similar to the system of FIG. 1, but having only a single releasable suction disc.

FIG. 15 illustrates an alternative suction-attached shelving system similar to the system of FIG. 1, but having only a single releasable suction disc. The system of FIG. 15 is generally similar to that of FIG. 1, but includes a suction-based attachment structure 1510 including a single releasable suction disc 1515, a single suction disc housing 1520, and a plurality of suction disc support arms 1525. The suction-attached shelving system 1500 also includes shelf structure 1550 with the front shelf portion 1555 and back shelf portion 1560. As further described herein the suction-based attachment structure 1510 may rotate relative to the shelf structure 1550 along the shelf rotation axle 1570.

In operation, the alternative embodiment of FIG. 15 operates substantially similarly to that of FIG. 1 except only a single releasable suction disc is employed. Further, other embodiments may include additional suctions discs, such as three, four, or more suction discs.

Also shown in FIG. 15 are the mechanical stops 490 which contact the suction disc support arms 125 when in the unfolded position.

Figure 16:
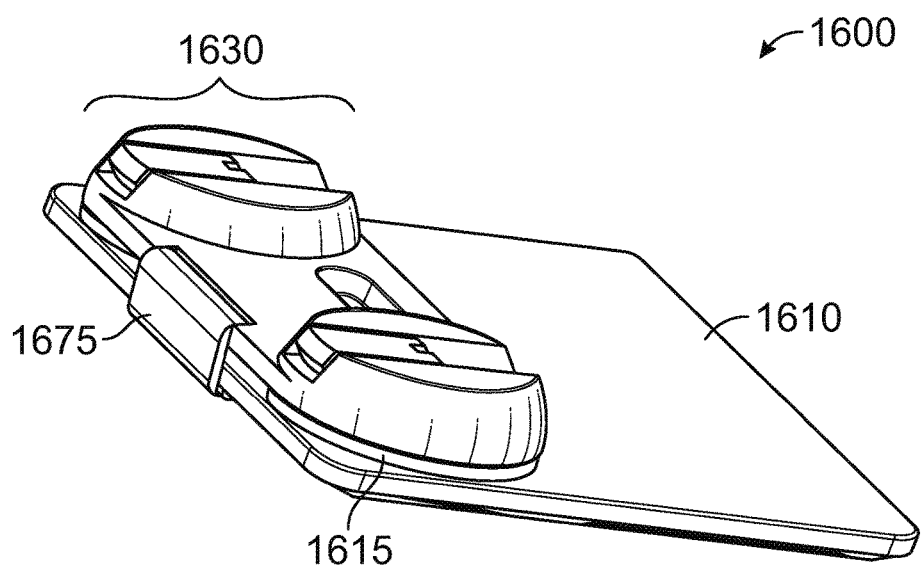
FIG. 16 illustrates a flip embodiment of the suction-attached shelving system in a folded position.

FIG. 16 illustrates a flip embodiment of the suction-attached shelving system in a folded position 1600.

Figure 17:
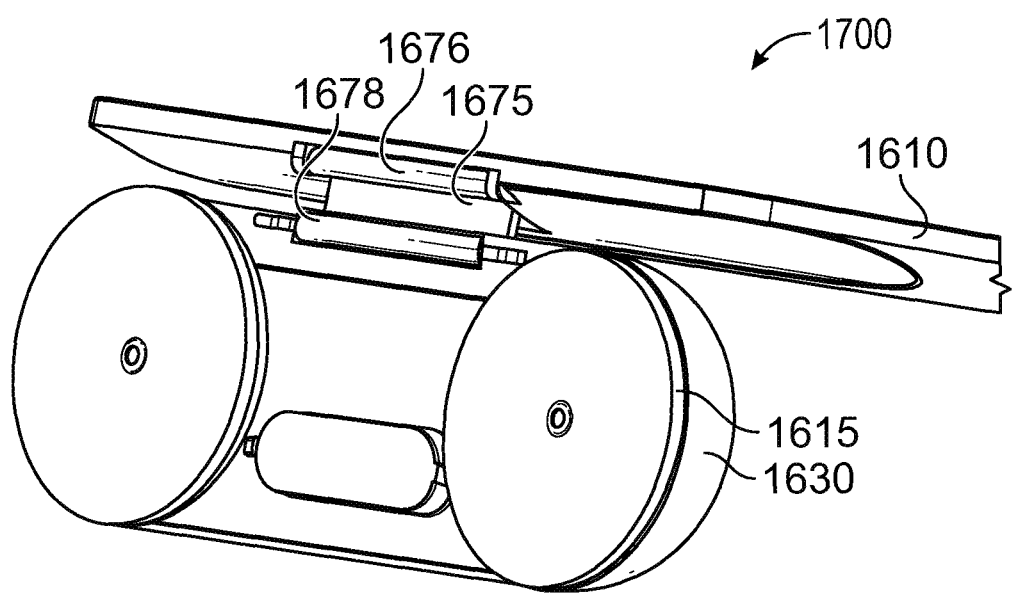
FIG. 17 illustrates the flip embodiment of the suction-attached shelving system in an unfolded position.

FIG. 17 illustrates the flip embodiment of the suction-attached shelving system in an unfolded position 1700.

As shown in FIGS. 16 and 17, the flip embodiment includes a main shelf 1610 and a suction based attachment structure 1630. The suction based attachment structure 1630 is generally similar to those described above, except it includes a flip hinge 1675.

As shown in FIG. 17, the flip hinge 1675 includes a shelf axle 1676 and a suction structure axle 1678. The main shelf 1610 may be rotated around the shelf axle 1676 and the suction based attachment structure 1630 may be rotated around the suction structure axle 1678. Additionally, each axle includes a mechanical stop that demarks an endpoint of its rotation when the flip embodiment is unfolded as shown in FIG. 17.

Additionally, as shown in FIG. 16, in the folded position, the flip embodiment allows the suction discs 1615 to be positioned proximally to the top surface of the main shelf 1610.

Figure 18:
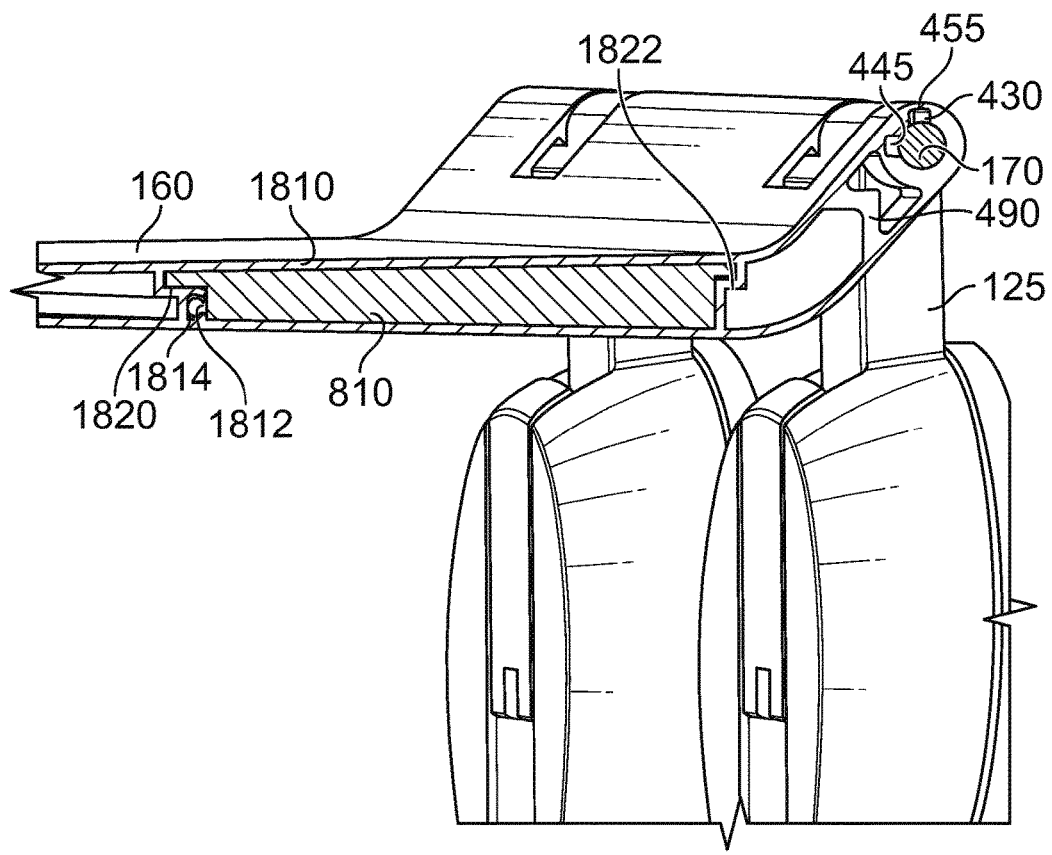
FIG. 18 illustrates a cut-away view showing the slide tray of FIG. 8 positioned in the back shelf portion as well as the shelf engagement key of FIG. 4 positioned in the unfolded position key aperture.

FIG. 18 illustrates a cut-away view showing the slide tray 810 of FIG. 8 positioned in the back shelf portion 160 as well as the shelf engagement key 430 of FIG. 4 positioned in the unfolded position key aperture 455.

As mentioned above, in operation, the back shelf portion 160 includes an aperture 1810 that is shaped to receive the slide tray 810 so that the slide tray 810 may be slid into and out of the side of the back shelf portion 160.

As shown in FIG. 18, the slide tray 810 includes a slide tray rail 1812 that travels in a slide tray rail housing 1814 positioned in the back shelf portion 160. Additionally, the slide tray 810 is supported by a front slide tray ledge 1820 and a rear slide tray ledge 1822. In operation, the slide tray rail 1812, slide tray rail housing 1814, front slide tray ledge 1820, and rear slide tray ledge 1822 allow the slide tray to be slid into and out of the back shelf portion 160 and to be supported.

FIG. 18 also illustrates the shelf rotation axle 170 including the shelf engagement key 430 engaged into the unfolded position key aperture 455. The folded position key aperture 445 is also shown. As discussed above, when the shelf engagement key 430 is induced into the unfolded position key aperture 455, it operates to fix the rotational position of the suction based attachment structure 110 and back shelf portion 160 in the unfolded position.

Also shown in FIG. 18 is a mechanical stop 490 which contacts the suction disc support arm 125 when in the unfolded position.

Figure 19:
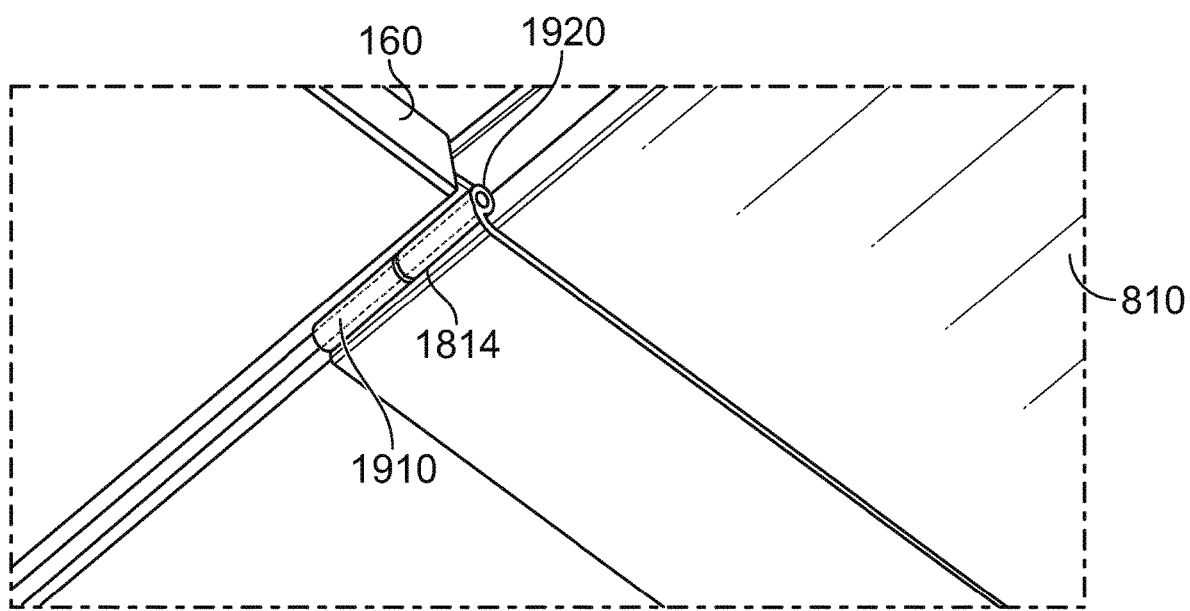
FIG. 19 is a view showing the slide tray of FIG. 18 showing a slide shelf stop.

FIG. 19 is a view showing the slide tray 810 of FIG. 18 showing a slide shelf stop. In FIG. 19, a roll pin 1920 has been affixed in the egress of the slide tray rail housing positioned in the back shelf portion 160. The slide tray 810 includes a slide shelf stop 1910 that is molded as part of the slide tray 810 and acts as the slide tray rail 1812 traveling in the slide tray rail housing 1814.

In operation, when the slide tray 810 is induced outwardly from the back shelf portion 160, the slide shelf stop 1910 travels along the slide tray rail housing 1814 until the slide shelf stop 1910 contacts the roll pin 1920. The roll pin 1920 stops the movement of the slide tray 810 and prevents the slide tray 810 from being removed from the back shelf portion 160

In one embodiment, as shown in FIG. 1, the back shelf portion of the main shelf has an upward slope to provide structural support and allow the suction discs to rest flat on the main shelf when folded.

In one embodiment, a keyed shaft runs the length of the spine with two keys that connect the suction disc housings to the shaft. When the release pin is depressed, the two keys clear out of the way for rotation of the suction disc housings. In one embodiment, the housings rotate as one unit for ease of use rather than rotating individually.

In one embodiment, the internal structure of the main shelf is hollowed to reduce weight in such a way that the main shelf may be manufactured as an extrusion and so that the internal support structure may serve as rails to guide the side shelf. The angled back shelf portion may be hollowed but retains a suction disc shaft stopper structure running the length of the back shelf portion. When the suction discs are in the unfolded position, the suction disc shaft stopper contacts the suction disc shafts, serving as a firm, mechanical stop to ensure the main shelf remains parallel to the ground under heavy load. The flat, longer size of the suction disc shaft stopper disperses the load placed on the suction disc shafts, reducing stress on any single point and therefore reducing the potential for structural failure of the suction disc shafts while under heavy load.

In one embodiment, the side shelf release button and side shelf stop are molded into the side shelf housing. The side shelf release button may be a living hinge and releases into a corresponding hole in the bottom of the back shelf portion. When the side shelf is retracted into the back shelf portion, the side shelf release button releases into the hole in the bottom of the back shelf portion, locking the side shelf in the retracted position. When the side shelf release button is depressed through the hole in the bottom of the main shelf, the side shelf is no longer locked in position and the user may then pull out the side shelf. A roll pin secured to the side shelf rail engages with the side shelf stop to prevent the side shelf from being separated from the main shelf.

In one embodiment, the two hinges connecting the front shelf portion and the back shelf portion of the main shelf are designed to support each half of the main shelf, inhibiting over-rotation when unfolded, keeping the front main shelf half parallel to the ground. From a design perspective, they are aligned with the suction disc housings and are the same width.

In one embodiment, a bubble level is recessed into the bottom of the front shelf portion, so the user can level the unit when installing it and then unfold the front shelf portion so the bubble level is no longer visible or in the way In one embodiment, the hook shaped disc shaft allows for tool-free replacement of the suction disc and/or lever. That is, the suction disc shaft hook 620 may be manually disengaged from the lever pivot bar 640 for example, by pushing the suction disk toward the lever, which compacts the suction disc spring 530 and may displace the suction disc shaft hook 620 from the lever pivot bar 640.

In addition, as shown in FIG. 3, the suction disc housing 120 includes relatively high suction lever side walls 322. The suction lever side walls 322 protect the side of the suction lever arm from side impact, particularly during transportation.

In one embodiment, the shelf structure or suction-based attachment contains a flat vertical structure that serves as a mechanical stop to the suction disc housing, ensuring the main shelf and suction-based attachment maintain a perpendicular relationship to one another in the unfolded position.

In other embodiments, any of the structures or mechanisms shown in any of the embodiments may be interchanged for use in the other embodiments.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A suction-attached shelving system including:
 a suction-based attachment structure including:
  a releasable suction disc;
  a suction disc housing; and
  a suction lever arm, wherein said suction lever arm initiates the mechanical operation of said suction disc and said suction disc housing to suctionally engage a surface;
 a shelf structure; and
 a shelf rotation axle, wherein said shelf rotation axle engages said suction-based attachment structure and said shelf structure,
 wherein said shelf structure includes:
  a front shelf portion having a front shelf portion shelf surface;
  a back shelf portion having a back shelf portion shelf surface; and
  a shelf hinge, wherein said shelf hinge allows said front shelf portion to be folded relative to said back shelf portion, so that said front shelf portion shelf surface and said back shelf portion shelf surface are in a substantially parallel alignment when folded.

2. The system of claim 1 further including a plurality of releasable suction discs.

3. The system of claim 1 further including a plurality of suction disc housings.

4. The system of claim 1 further including a plurality of suction lever arms.

5. The system of claim 1 wherein said suction disc housing is double-walled.

6. The system of claim 1 wherein said shelf rotation axle allows said suction-based attachment structure to be rotationally positioned so that said releasable suction disc is proximal to said back shelf portion.

7. The system of claim 1 wherein said shelf rotation axle includes a shelf engagement key.

8. The system of claim 7 wherein said shelf engagement key may be engaged with a key aperture to arrest the rotation of said suction-based attachment structure relative to said shelf structure.

9. The system of claim 7 wherein said shelf engagement key may be engaged with a shelf rotation aperture to allow the rotation of said suction-based attachment structure relative to said shelf structure.

10. The system of claim 9 wherein said shelf rotation axle includes a release pin that allows said shelf engagement key to be engaged with said shelf rotation aperture.

11. The system of claim 1 wherein said a shelf structure includes a tray that may be slidably extended.

12. The system of claim 1 wherein said suction-based attachment system includes a suction disc support arm.

13. The system of claim 12 wherein said shelf structure includes a mechanical stop that contacts said suction disc support arm and limits the rotation of said shelf structure relative to said suction disc support arm.

14. The system of claim 1 wherein said releasable suction disc is attached to a suction disc shaft.

15. The system of claim 14 wherein said suction disc shaft terminates in a suction disc shaft hook.

16. The system of claim 15 wherein said suction lever arm includes a lever pivot bar.

17. The system of claim 16 wherein said suction disc shaft hook engages said lever pivot bar.

18. The system of claim 17 wherein said suction disc shaft hook is manually disengageable from said lever pivot bar.

\* \* \* \* \*